(12) United States Patent
Barrett et al.

(10) Patent No.: US 12,480,331 B1
(45) Date of Patent: Nov. 25, 2025

(54) SHEAR PIN LATCH RECEPTACLE ASSEMBLY FOR AIRCRAFT DOORS

(71) Applicant: American Honda Motor Co., Inc., Raymond, OH (US)

(72) Inventors: Julian Rupert Barrett, Savannah, GA (US); Marc R. Lambert, Reidsville, NC (US)

(73) Assignee: AMERICAN HONDA MOTOR CO., INC., Torrance, CA (US)

( * ) Notice: Subject to any disclaimer, the term of this patent is extended or adjusted under 35 U.S.C. 154(b) by 0 days.

(21) Appl. No.: 19/032,968

(22) Filed: Jan. 21, 2025

(51) Int. Cl.
*E05B 15/02* (2006.01)
*B64C 1/14* (2006.01)

(52) U.S. Cl.
CPC .......... *E05B 15/024* (2013.01); *B64C 1/1461* (2013.01)

(58) Field of Classification Search
CPC ............................ E05B 15/024; B64C 1/1461
See application file for complete search history.

(56) References Cited

U.S. PATENT DOCUMENTS

| | | | |
|---|---|---|---|
| 3,385,624 A * | 5/1968 | Baclini | E05B 15/024 403/4 |
| 8,667,663 B2 | 3/2014 | Maxwell et al. | |
| 8,789,855 B2 | 7/2014 | Koneczny | |
| 11,661,166 B2 | 5/2023 | Mortland | |
| 2012/0085865 A1* | 4/2012 | Gorgoglione | B64C 1/1461 244/129.5 |
| 2018/0195325 A1* | 7/2018 | Amante | B64C 27/04 |

FOREIGN PATENT DOCUMENTS

| | | |
|---|---|---|
| CN | 204299362 U | 4/2015 |
| CN | 115573623 A | 1/2023 |
| EP | 3738870 B1 | 12/2021 |
| KR | 101243855 B1 | 3/2013 |
| KR | 101858664 B1 | 5/2018 |
| RU | 213849 U | 9/2022 |
| WO | 2013172804 A1 | 11/2013 |
| WO | 2014091294 A1 | 6/2014 |

* cited by examiner

*Primary Examiner* — Rodney A Bonnette
(74) *Attorney, Agent, or Firm* — Plumsea Law Group, LLC

(57) ABSTRACT

A shear pin latch receptacle assembly including an inner bushing; an outer eccentric bushing including a first inner bore configured to receive the inner bushing; a stabilizer member configured to be assembled with the inner bushing and the outer eccentric bushing to form a subassembly; and a housing including a mounting plate and a barrel, the barrel defining a second inner bore configured to receive the subassembly. The outer eccentric bushing is rotatable relative to the housing in order to adjust the receptacle assembly. In addition, when the receptacle assembly is assembled, the stabilizer member prevents rotation of the inner bushing with respect to the housing.

20 Claims, 19 Drawing Sheets

SHEAR PIN LATCH RECEPTACLE ASSEMBLY FOR AIRCRAFT DOORS

BACKGROUND

1. Field of the Disclosure

The present disclosure relates to a shear pin latch receptacle assembly and, more particularly, to a shear pin latch receptacle assembly including a first, stationary bushing and a second bushing that is eccentric and rotatable to adjust the latch receptacle assembly.

2. Description of Related Art

In existing shear pin latching systems, the adjustment is achieved by separately adjusting two eccentric components of the receptacle to achieve the desired adjustment. With two separate eccentric bushings (or barrels), the assembly is heavier and occupies more space. The eccentric bushings (or barrels) are secured by friction (which is a passive manner in which to secure the bushings) with a fastener to prevent rotational and axial movement.

There is a need in the art for a shear pin latch receptacle assembly that addresses one or more of the issues noted above.

SUMMARY OF THE INVENTION

The disclosed shear pin latching system implements a single adjustable eccentric receptable. With the disclosed receptacle, the adjustment is performed by only turning the outer bushing which engages the inner bushing having an intended adjustment range of 180 degrees. The inner bushing is unable to back drive the outer bushing and mechanically provides anti-rotation capability without relying on friction (i.e., the anti-rotation capability is an active mechanism). The axial position of the bushings is secured with a fastener. Due to the configuration of the system, the assembly is compact and light. With the disclosed assembly, maintenance technicians have the ability to make fine tuning adjustments in the field. In addition, with fewer parts to adjust, the disclosed assembly saves time and cost associated with adjustments by maintenance technicians.

In one aspect, the present disclosure is directed to a shear pin latch receptacle assembly. The assembly includes an inner bushing; an outer eccentric bushing including a first inner bore configured to receive the inner bushing; a stabilizer member configured to be assembled with the inner bushing and the outer eccentric bushing to form a subassembly; and a housing including a mounting plate and a barrel, the barrel defining a second inner bore configured to receive the subassembly. The outer eccentric bushing is rotatable relative to the housing in order to adjust the receptacle assembly. In addition, when the receptacle assembly is assembled, the stabilizer member prevents rotation of the inner bushing with respect to the housing.

In another aspect, the present disclosure is directed to an aircraft including a cabin door; a cabin door frame; and a shear pin latch receptacle assembly. The assembly includes an inner bushing; an outer eccentric bushing including a first inner bore configured to receive the inner bushing; a stabilizer member configured to be assembled with the inner bushing and the outer eccentric bushing to form a subassembly; and a housing including a mounting plate and a barrel, the barrel defining a second inner bore configured to receive the subassembly. The outer eccentric bushing is rotatable relative to the housing in order to adjust the receptacle assembly. In addition, when the receptacle assembly is assembled, the stabilizer member prevents rotation of the inner bushing with respect to the housing.

In another aspect, the present disclosure is directed to a method of assembling a shear pin latch receptacle assembly. The method includes inserting an inner bushing into a first inner bore of an outer eccentric bushing; engaging a stabilizer member with the inner bushing to form a subassembly including the inner bushing, the outer eccentric bushing, and the stabilizer member; and inserting the subassembly into a second bore of a barrel of a housing. The outer eccentric bushing is rotatable relative to the housing in order to adjust the receptacle assembly. In addition, when the receptacle assembly is assembled, the stabilizer member prevents rotation of the inner bushing with respect to the housing.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The present disclosure is directed to a shear pin latch receptacle assembly. The assembly includes a single adjustable eccentric receptacle. The disclosed receptacle is adjustable simply by turning an outer eccentric bushing which rotates around an inner stationary bushing. The present disclosure is further directed to an aircraft including a cabin door that implements a shear pin latching system with the disclosed single adjustable receptacle.

Figure 1:
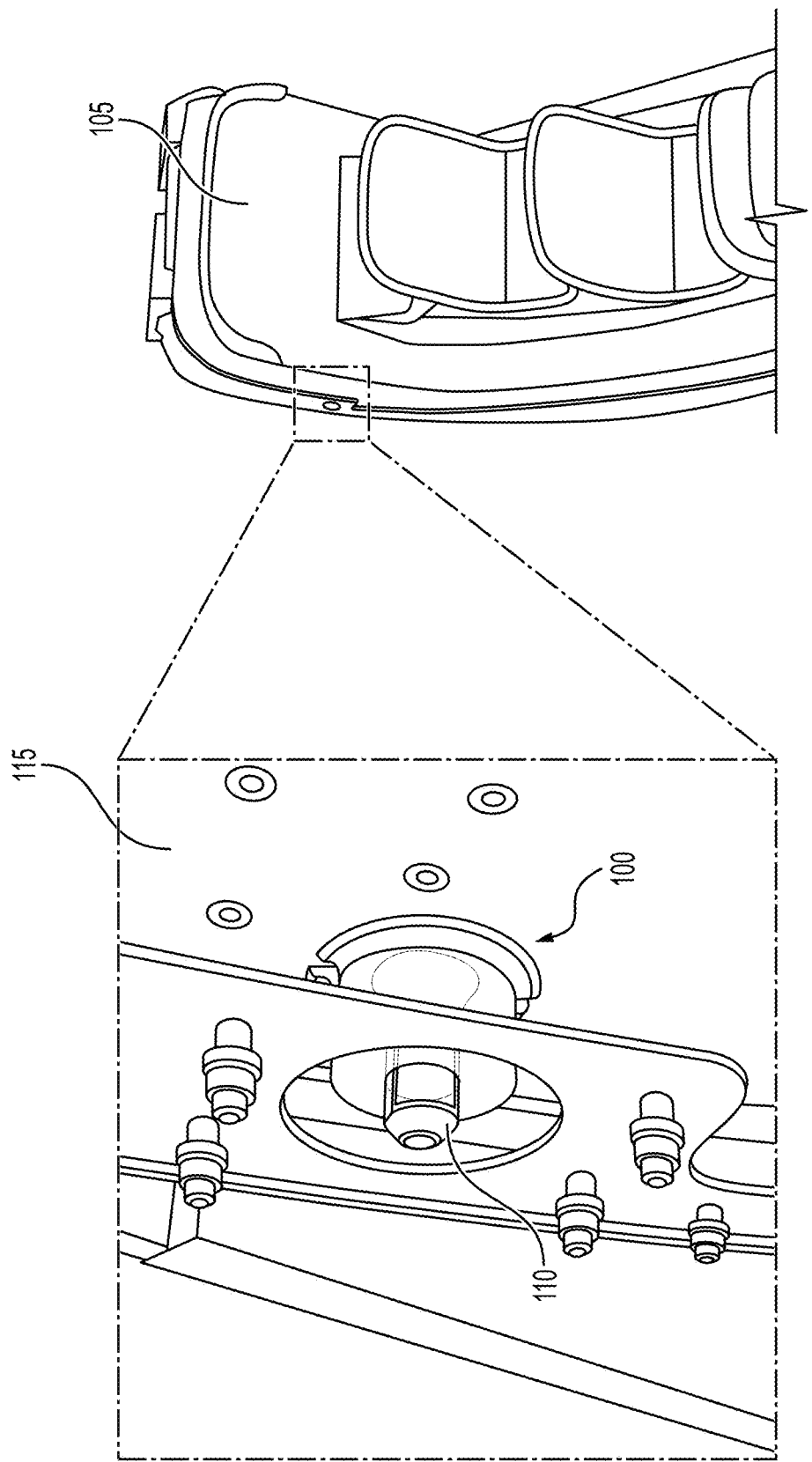
FIG. 1 is a schematic perspective view of an aircraft door having a shear pin latching system.

FIG. 1 is a schematic perspective view of an aircraft door having a shear pin latching system. FIG. 1 shows a shear pin latch receptacle assembly 100 associated with an aircraft cabin door 105. Receptacle assembly 100 is shown with a latching pin 110 extending through a door frame 115 and through receptacle assembly 100 itself. FIG. 1 shows the hidden portions of receptacle assembly 100. The exposed portions as well as the inner components of receptacle assembly 100 are shown in the figures that follow.

Figure 2:
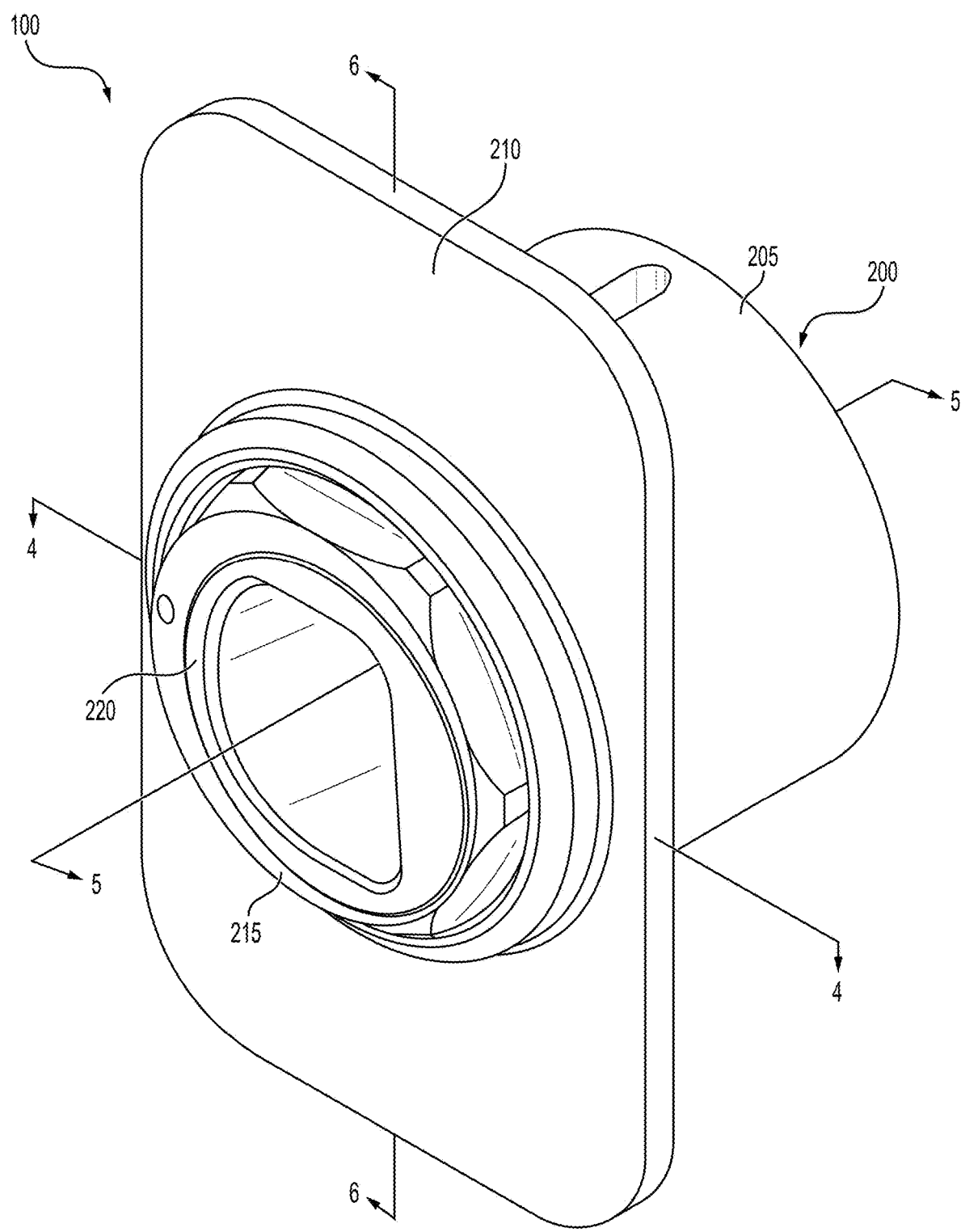
FIG. 2 is a schematic perspective assembled view of an exemplary shear pin latch receptacle assembly.

FIG. 2 is a schematic perspective assembled view of an exemplary shear pin latch receptacle assembly. As shown in FIG. 2, receptacle assembly 100 includes a housing 200. Housing 200 includes a barrel 205 extending from a plate 210. In addition, receptacle assembly 100 includes an outer eccentric bushing 215 (also referred to herein simply as "outer bushing 215") that is configured to be received within barrel 205 of housing 200. In addition, receptacle assembly 100 also includes an inner bushing 220 configured to be received within outer bushing 215.

The disclosed shear pin latch receptacle assembly includes an inner bushing and an outer eccentric bushing including a first inner bore configured to receive the inner bushing. The receptacle assembly further includes a stabilizer member configured to be assembled with the inner bushing and the outer eccentric bushing to form a subassembly. In addition, the receptacle assembly includes a housing including a mounting plate and a barrel, the barrel defining a second inner bore configured to receive the subassembly. The outer eccentric bushing is rotatable relative to the housing in order to adjust the receptacle assembly and wherein, when the receptacle assembly is assembled, the stabilizer member prevents rotation of the inner bushing with respect to the housing.

Figure 3:
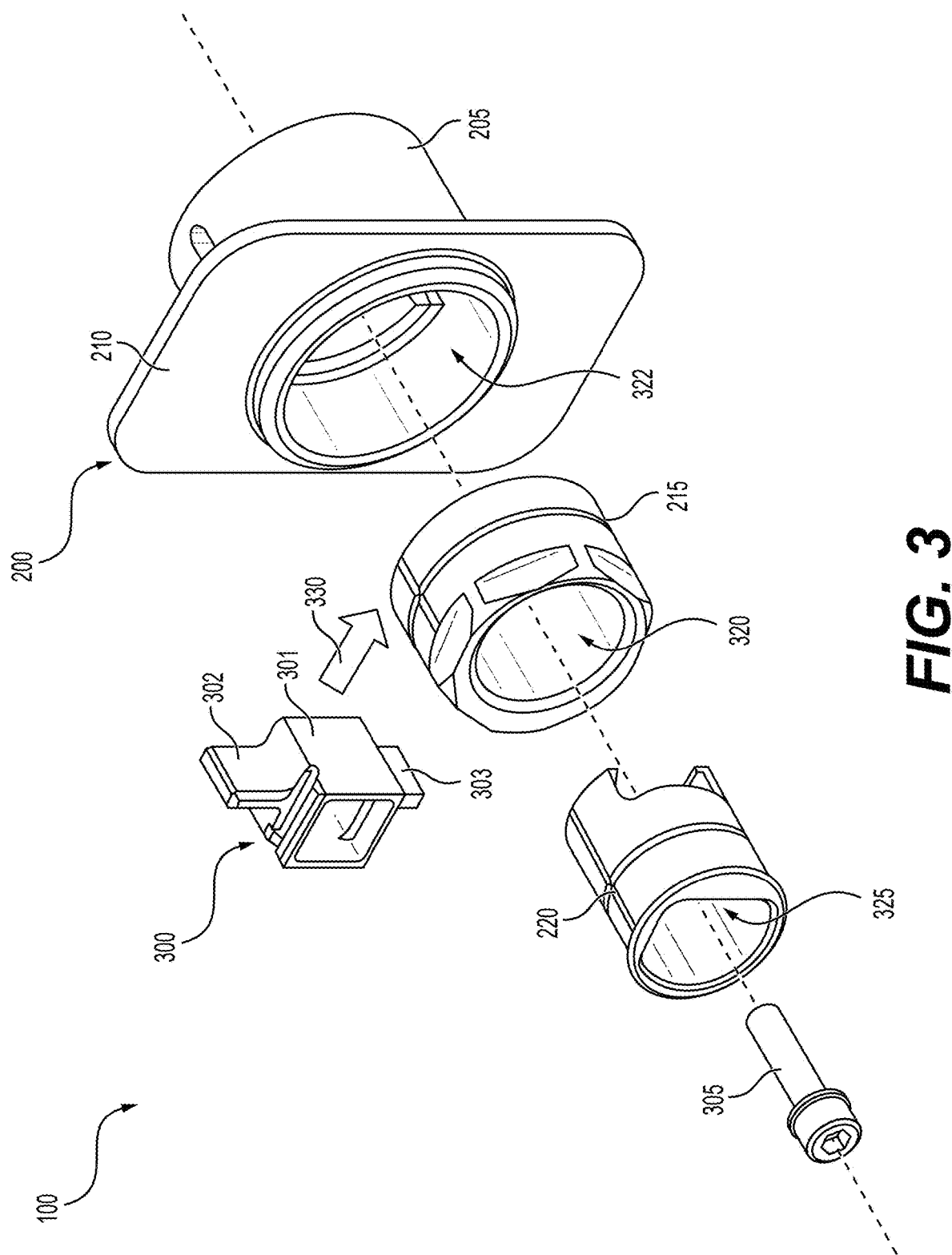
FIG. 3 is a schematic perspective exploded view of the shear pin latch receptacle assembly of FIG. 2.

FIG. 3 is a schematic perspective exploded view of the shear pin latch receptacle assembly of FIG. 2. As shown in FIG. 3, housing 200 includes a first bore 322 configured to receive outer bushing 215, which in turn includes a second bore 320 configured to receive inner bushing 220. Inner bushing 220 includes a third bore 325 configured to receive a latching pin of a shear pin latching system.

As also shown in FIG. 3, receptacle assembly 100 includes a stabilizer member 300. Stabilizer member 300 includes a body 301 and one or more flanges extending from body 301 and configured to interact with slots in barrel 205 of housing 200. In particular, stabilizer member 300 includes a first flange 302 extending in a first direction from body 301 of stabilizer member 300, and a second flange 303 extending in a substantially opposite direction from first flange 302.

As also shown in FIG. 3, receptacle assembly 100 also includes a fastener 305 configured to secure the components of assembly 100 axially with respect to one another.

Figure 4:
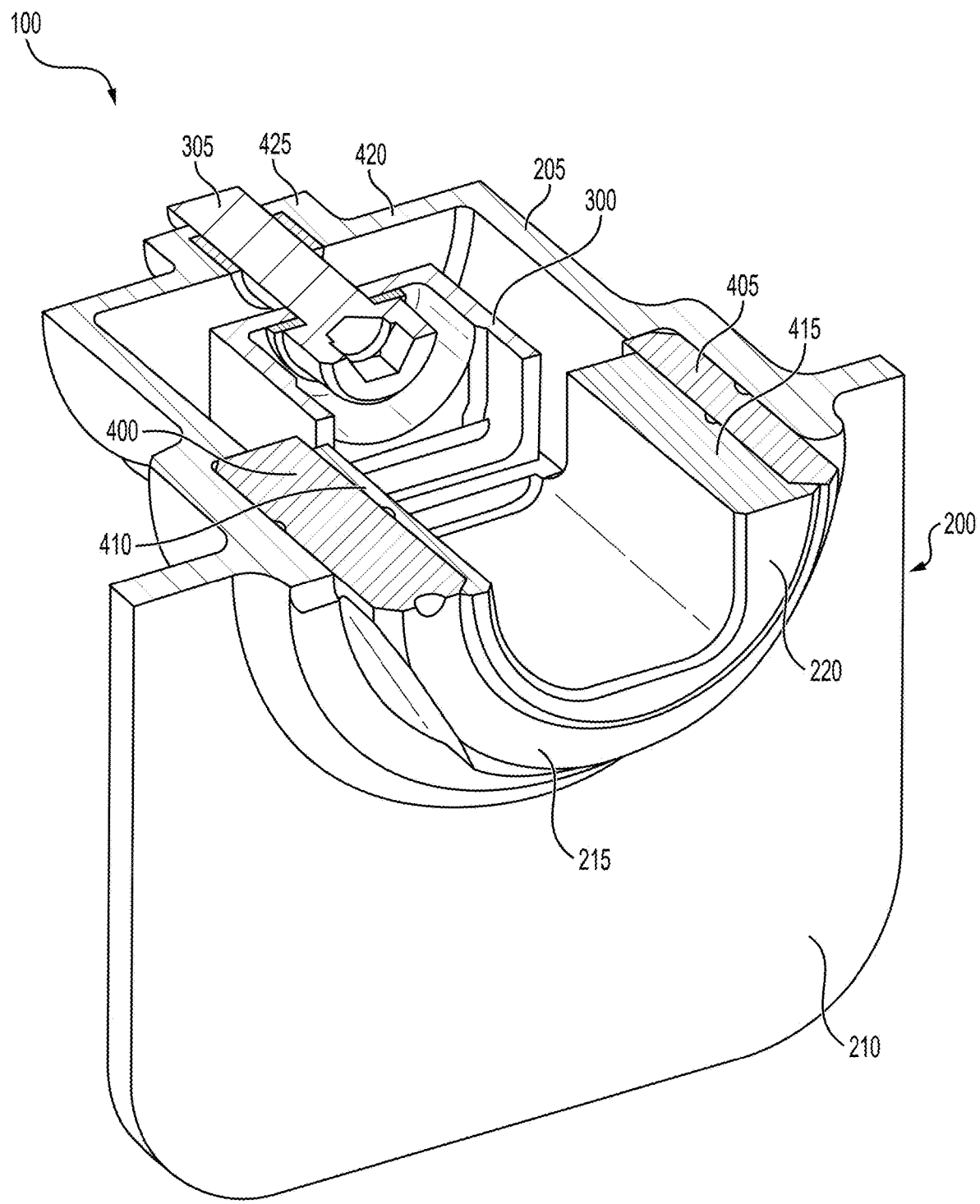
FIG. 4 is a schematic perspective cutaway cross-sectional view of the shear pin latch receptacle assembly taken at section line 4-4 in FIG. 2.

FIG. 4 is a schematic perspective cutaway cross-sectional view of the shear pin latch receptacle assembly taken at section line 4-4 in FIG. 2. FIG. 4 illustrates the eccentric configuration of outer bushing 215 and inner bushing 220. As shown in FIG. 4, outer bushing 215 is larger on a first side 400 and thinner on a second side 405. Similarly, inner bushing 220 is thinner on a first side 410 and thicker on a second side 415.

In addition, as also shown in FIG. 4, fastener 305, secures stabilizer member 300 with respect to a rear wall 420 of barrel 205. As noted above, rear wall 420 includes a threaded portion 425 configured to receive fastener 305.

Figure 5:
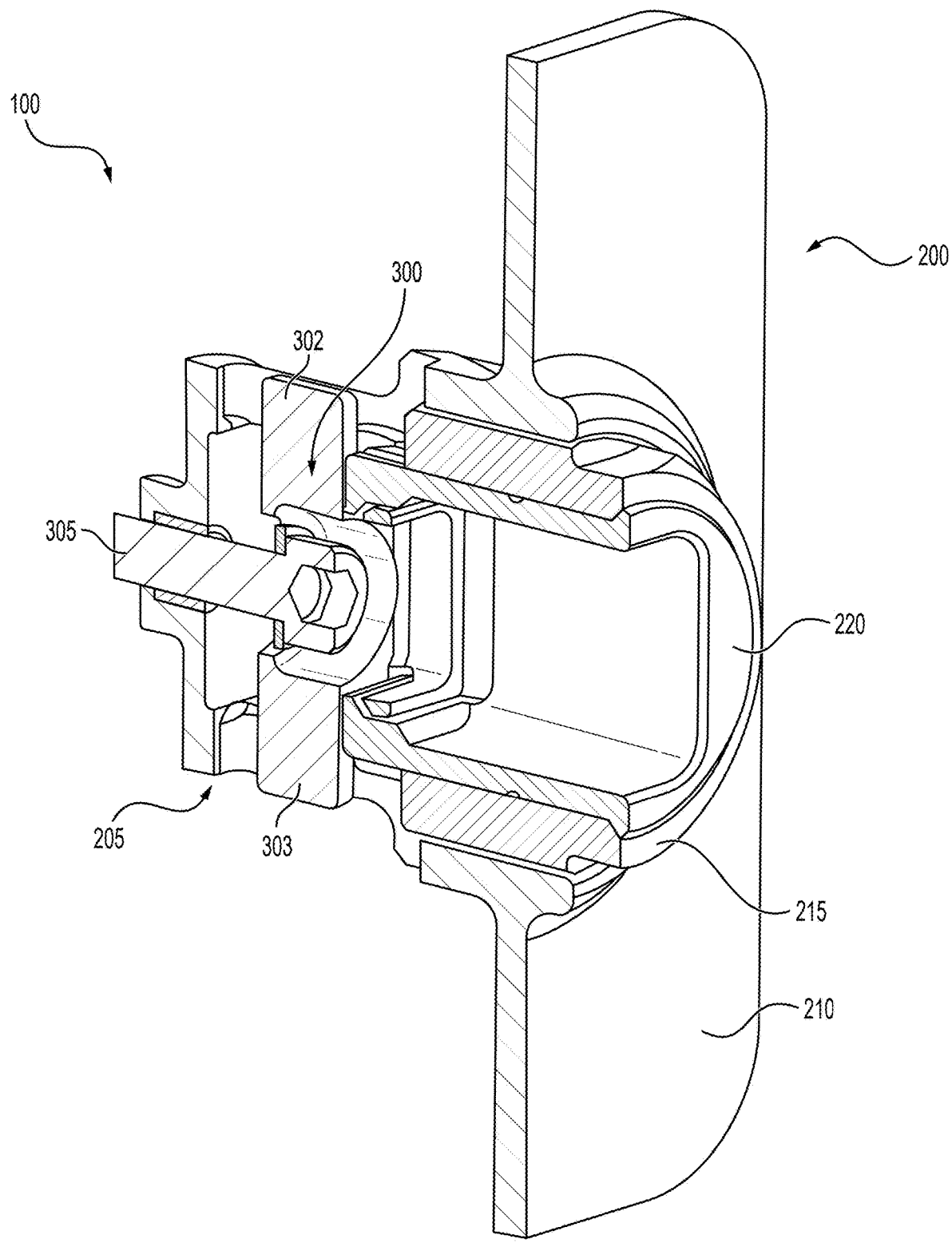
FIG. 5 is a schematic perspective cutaway cross-sectional view of the shear pin latch receptacle assembly taken at section line 5-5 in FIG. 2.

FIG. 5 is a schematic perspective cutaway cross-sectional view of the shear pin latch receptacle assembly taken at section line 5-5 in FIG. 2. FIG. 5 shows first flange 302 and second flange 303 of stabilizer member 300 extending through slots in barrel 205. The slots in barrel 205 are shown in, and discussed with respect to, FIGS. 7, 18, and 19.

Figure 6:
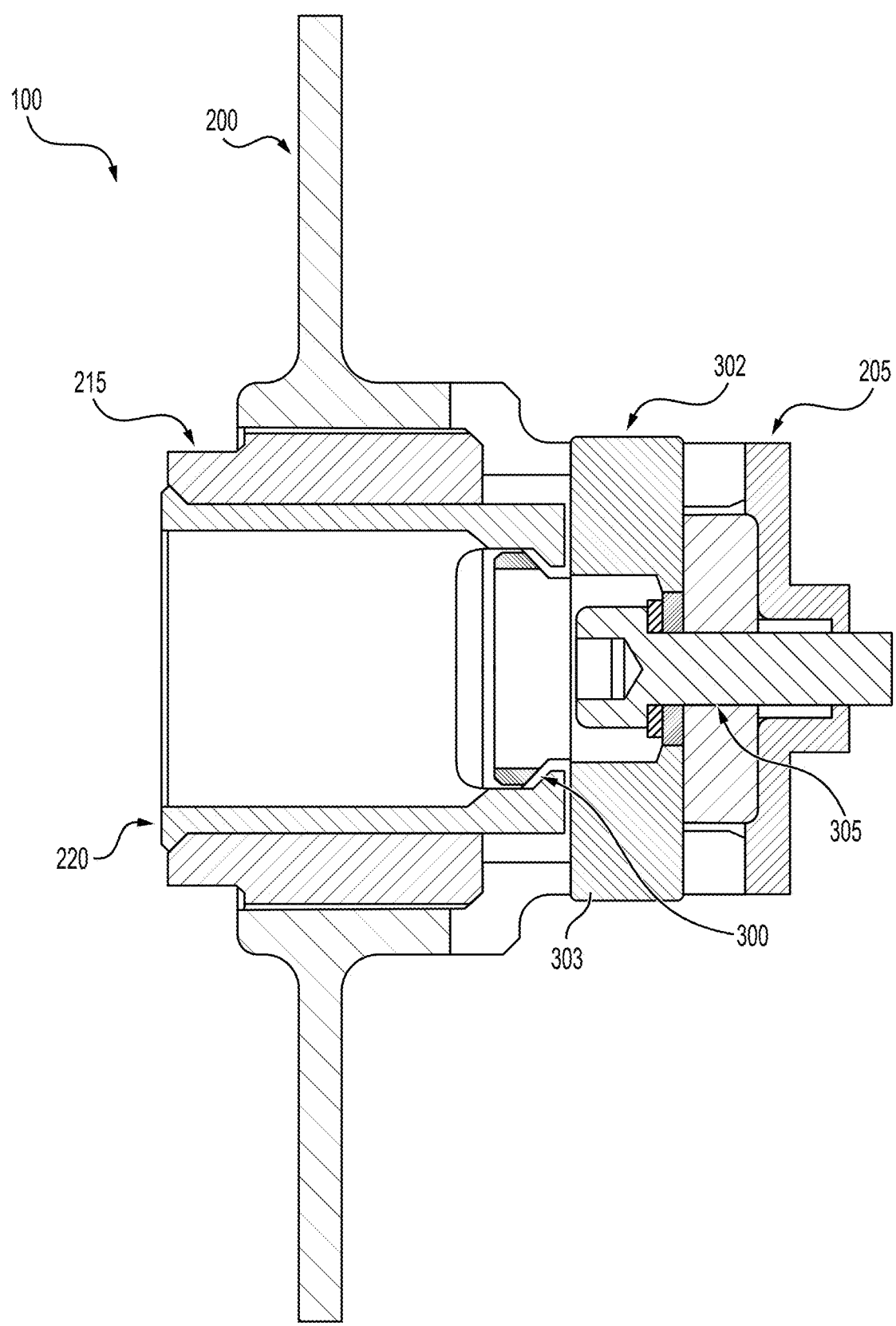
FIG. 6 is a schematic cross-sectional view of the shear pin latch receptacle assembly taken at section line 6-6 in FIG. 2.

FIG. 6 is a schematic cross-sectional view of the shear pin latch receptacle assembly taken at section line 6-6 in FIG. 2. FIG. 6 also shows first flange 302 and second flange 302 of stabilizer member 300 extending through slots in barrel 205.

Figure 7:
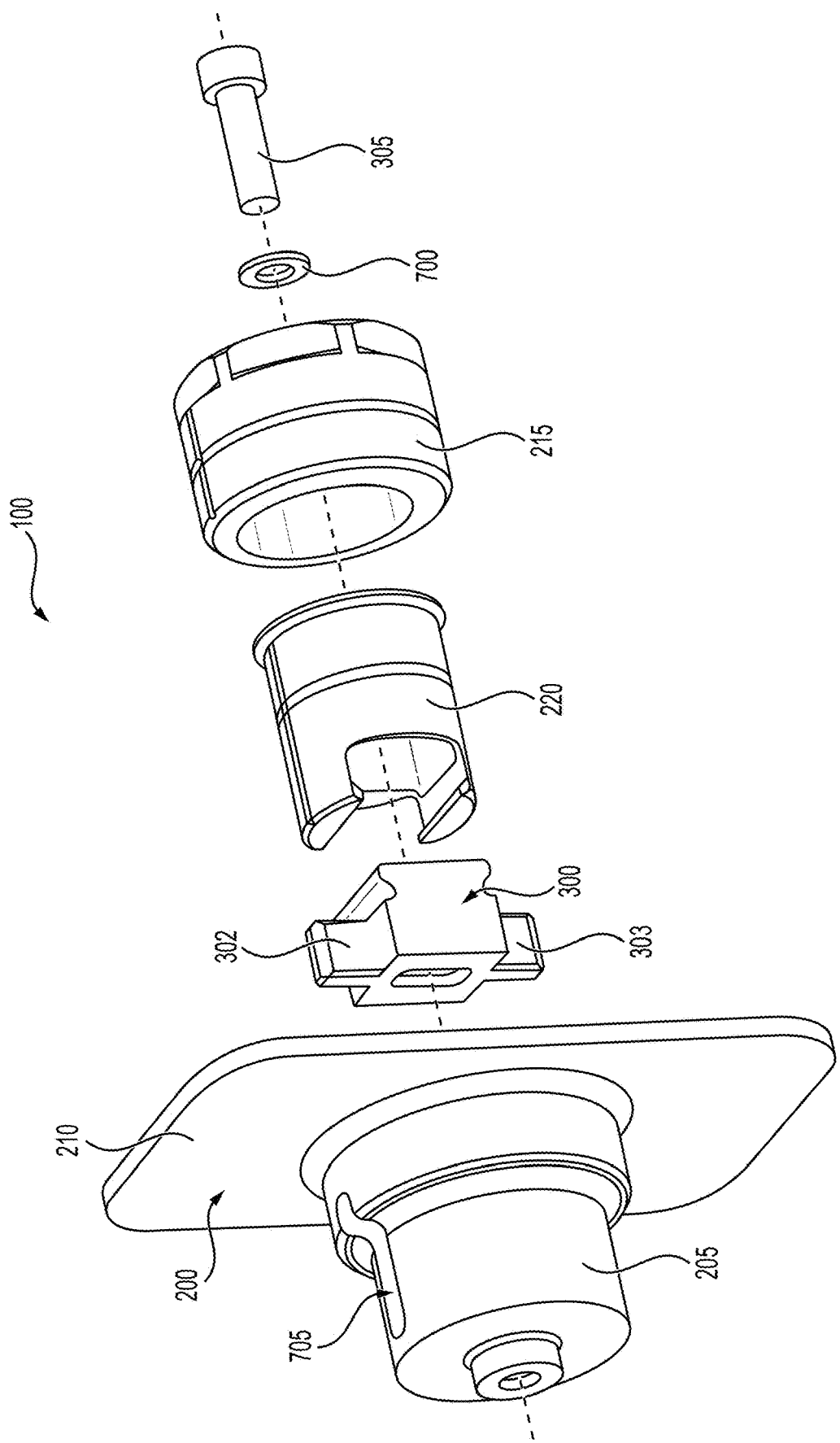
FIG. 7 is a schematic perspective exploded view of the embodiment of the shear pin latch receptacle assembly.

FIG. 7 is a schematic perspective exploded view of the embodiment of the shear pin latch receptacle assembly shown in FIGS. 4-6. As shown in FIG. 7, receptacle assembly 100 may include a washer 700 associated with fastener 305. In addition, a first slot 705 is provided in barrel 205 of housing 200. First slot 705 is configured to receive first flange 302 of stabilizer member 300 to prevent rotation of stabilizer member 300 and inner bushing 220, with which stabilizer member 300 is interlocked when assembled.

Figure 8:
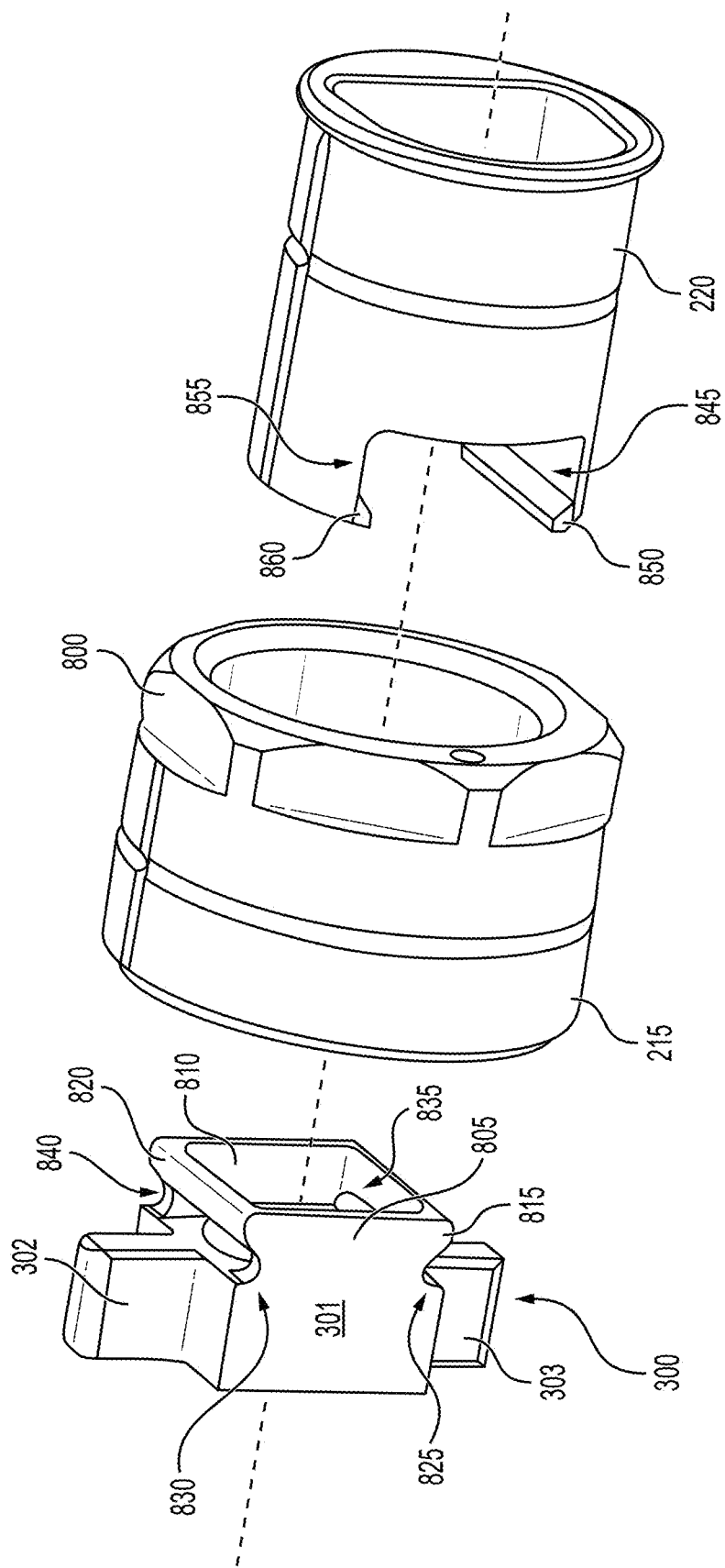
FIG. 8 is a schematic perspective exploded view of a subassembly of the shear pin latch receptacle assembly of FIG. 7.

FIG. 8 is a schematic perspective exploded view of a subassembly of the shear pin latch receptacle assembly of FIG. 7. As shown in FIG. 8, outer bushing 215 includes a plurality of flats 800 configured to interface with a wrench for adjustment of the receptacle assembly.

Figures 12, 13:
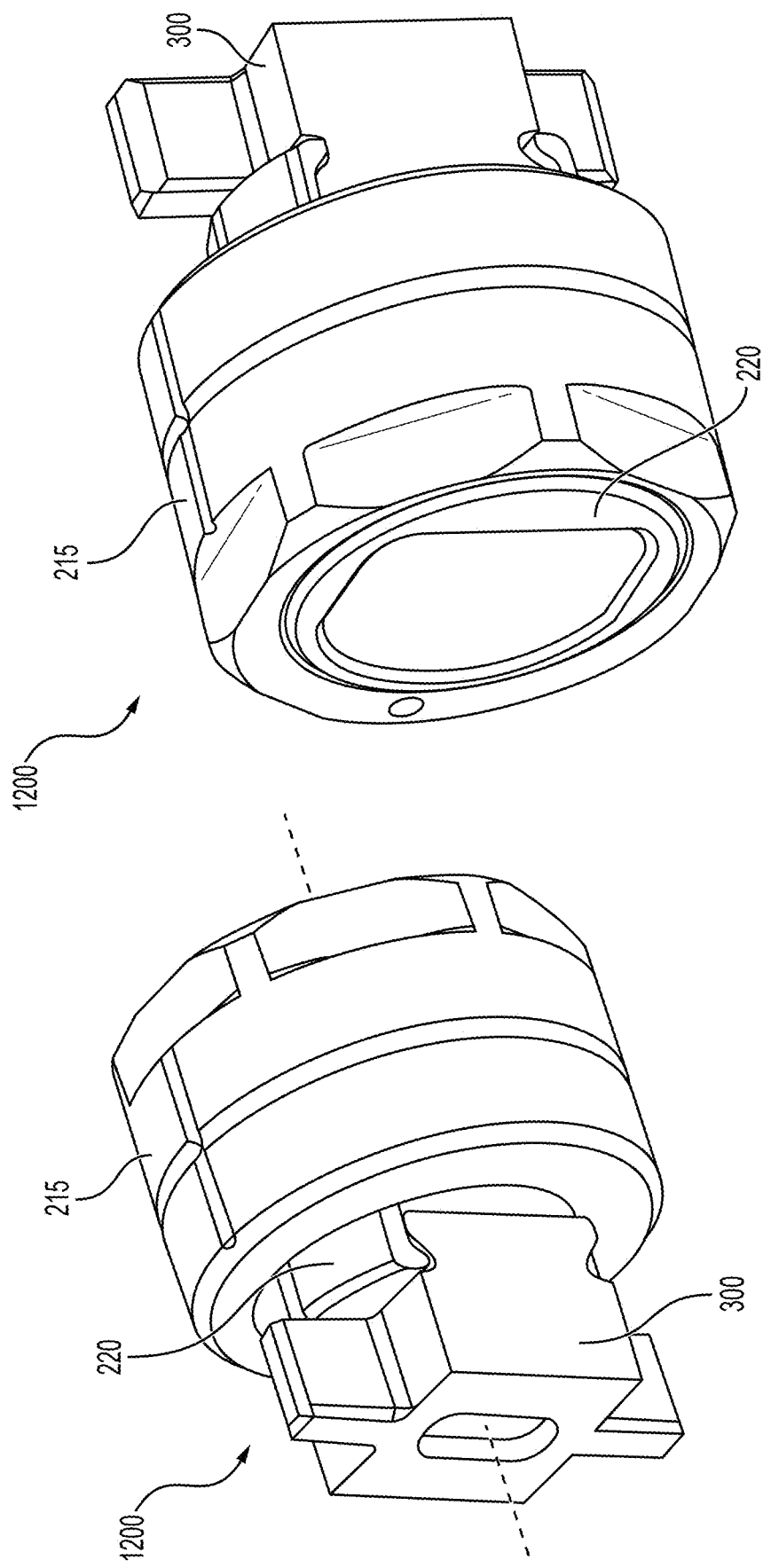
FIG. 12 is a schematic perspective view of the subassembly in an assembled condition.
FIG. 13 is another schematic perspective view of the subassembly in an assembled condition.

As shown in FIGS. 8-12, outer housing 215, inner housing 220, and stabilizer member 300 are assembled to form a subassembly 1200 (see FIG. 12 for illustration of assembled subassembly 1200). When assembled, inner bushing 220 interlocks with stabilizer member 300 such that inner bushing 220 does not rotate with respect to stabilizer member 300. Inner bushing 220 and stabilizer member 300 interlock with one another with a dovetail type interconnection.

The components of the dovetail type interconnection are shown in FIG. 8. In particular, stabilizer member 300 includes a first wall 805 and a second wall 810. Extending between first wall 805 and second wall 810 are a first lip 815 and a second lip 820. First wall 805 includes a first recess 825 adjacent first lip 815 and a second recess 830 adjacent second lip 820. In addition, second wall 810 includes a third recess 835 adjacent first lip 815 and a fourth recess 840 adjacent second lip 820.

Figure 16:
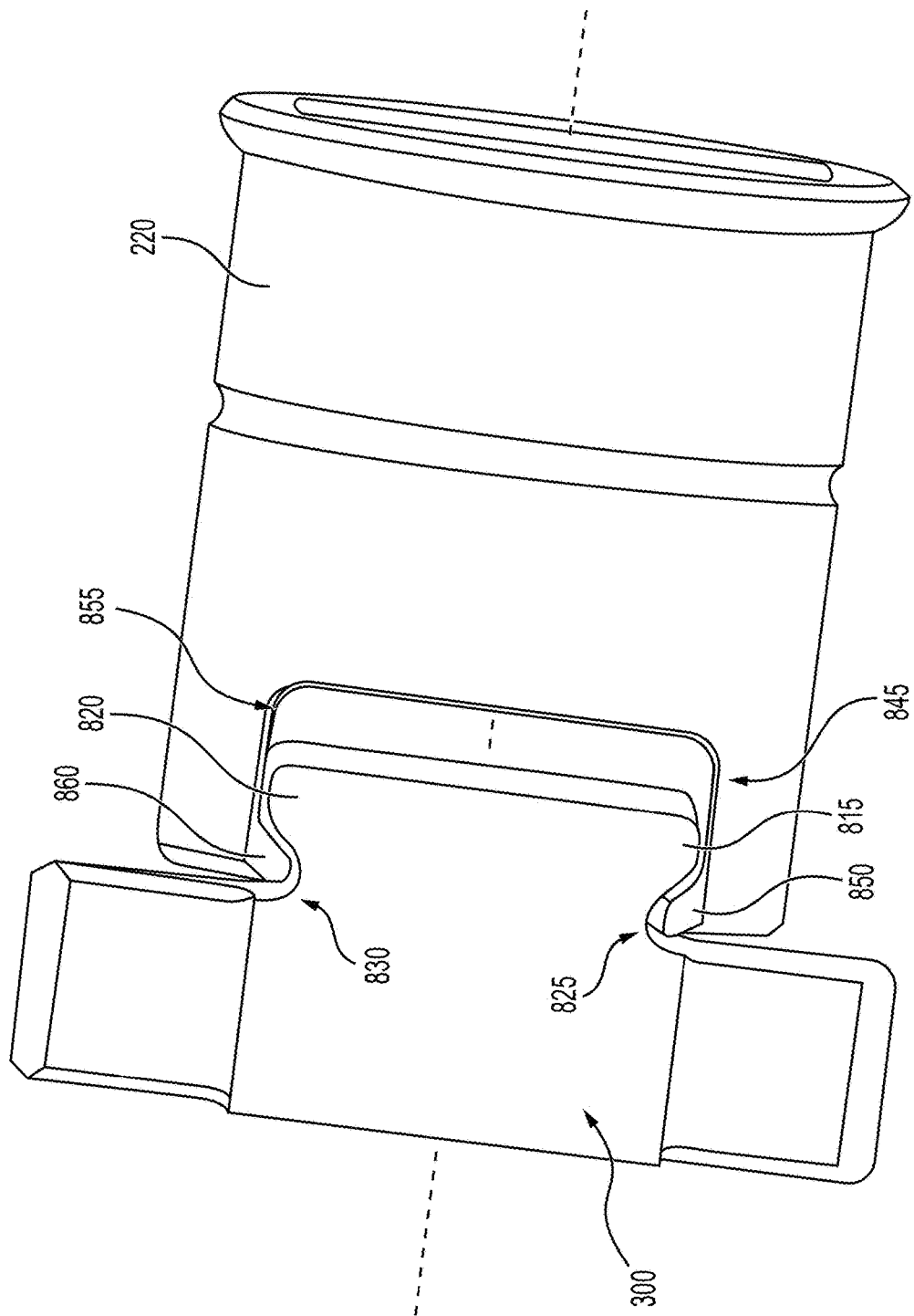
FIG. 16 is a schematic side view of the inner bushing and stabilizer member in an assembled condition.

Configured to mate with these structures of stabilizer member 300 are features of inner bushing 200. In particular, inner bushing 200 includes a fifth recess 845 defined by a third lip 850. Inner bushing 200 also includes a sixth recess 855 defined by a fourth lip 860. As best shown in FIG. 16, first lip 815 is received within fifth recess 845 and second lip 820 is received within sixth recess 855. Returning to FIG. 8, it will also be understood that third lip 850 is received within first recess 825 and third recess 835, and fourth lip 860 is received within second recess 830 and fourth recess 840.

Figure 9:
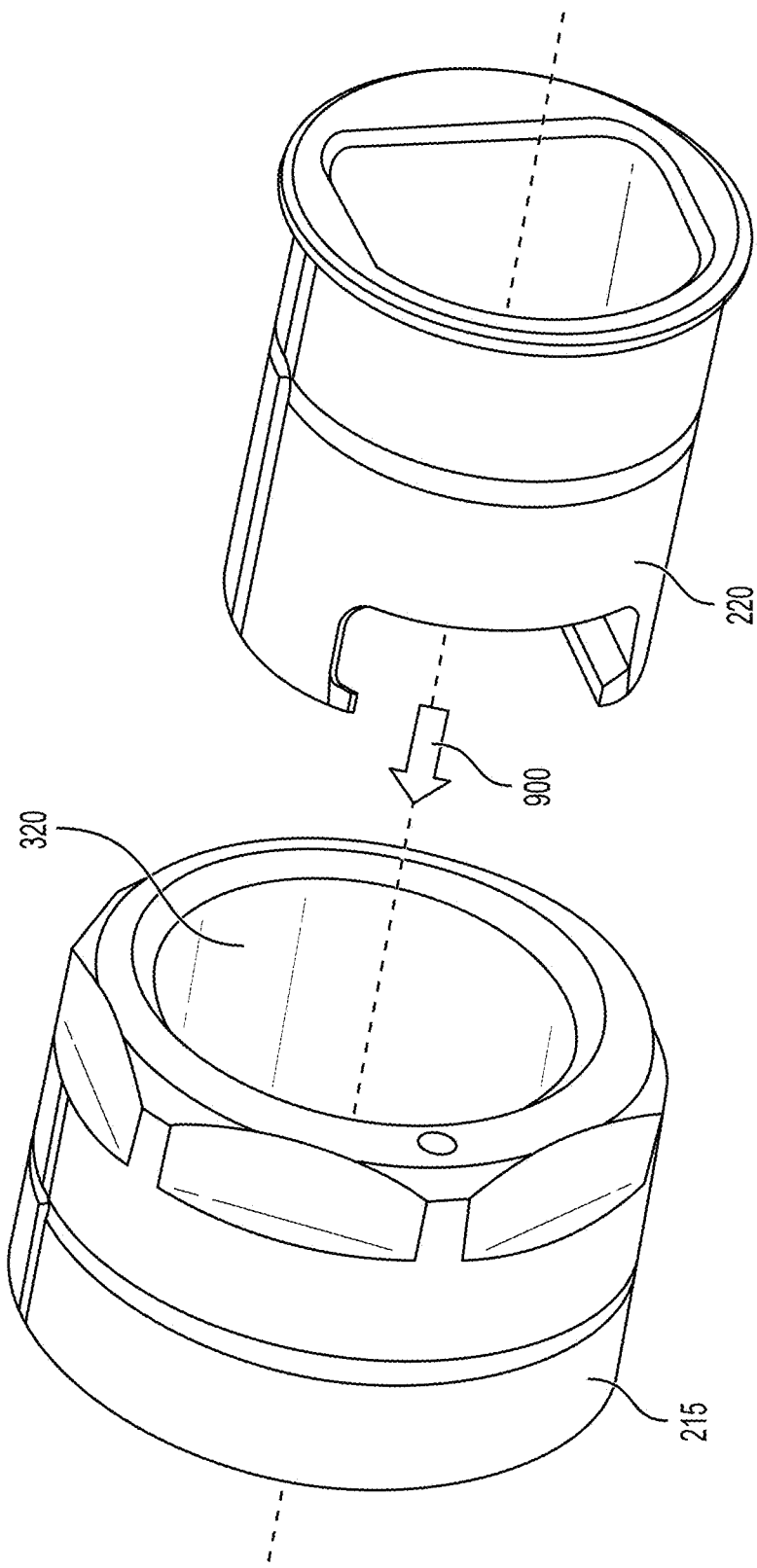
FIG. 9 is a schematic perspective exploded view of an inner bushing and an outer bushing of the shear pin latch receptacle assembly of FIG. 7.

The first step in assembling the subassembly is inserting an inner bushing into a first inner bore of an outer eccentric bushing. FIG. 9 is a schematic perspective exploded view of an inner bushing and an outer bushing of the shear pin latch receptacle assembly of FIG. 7. The first step in assembling the sub assembly is to insert inner bushing 220 into second bore 320 of outer bushing 215, as indicated by an arrow 900.

Figure 10:
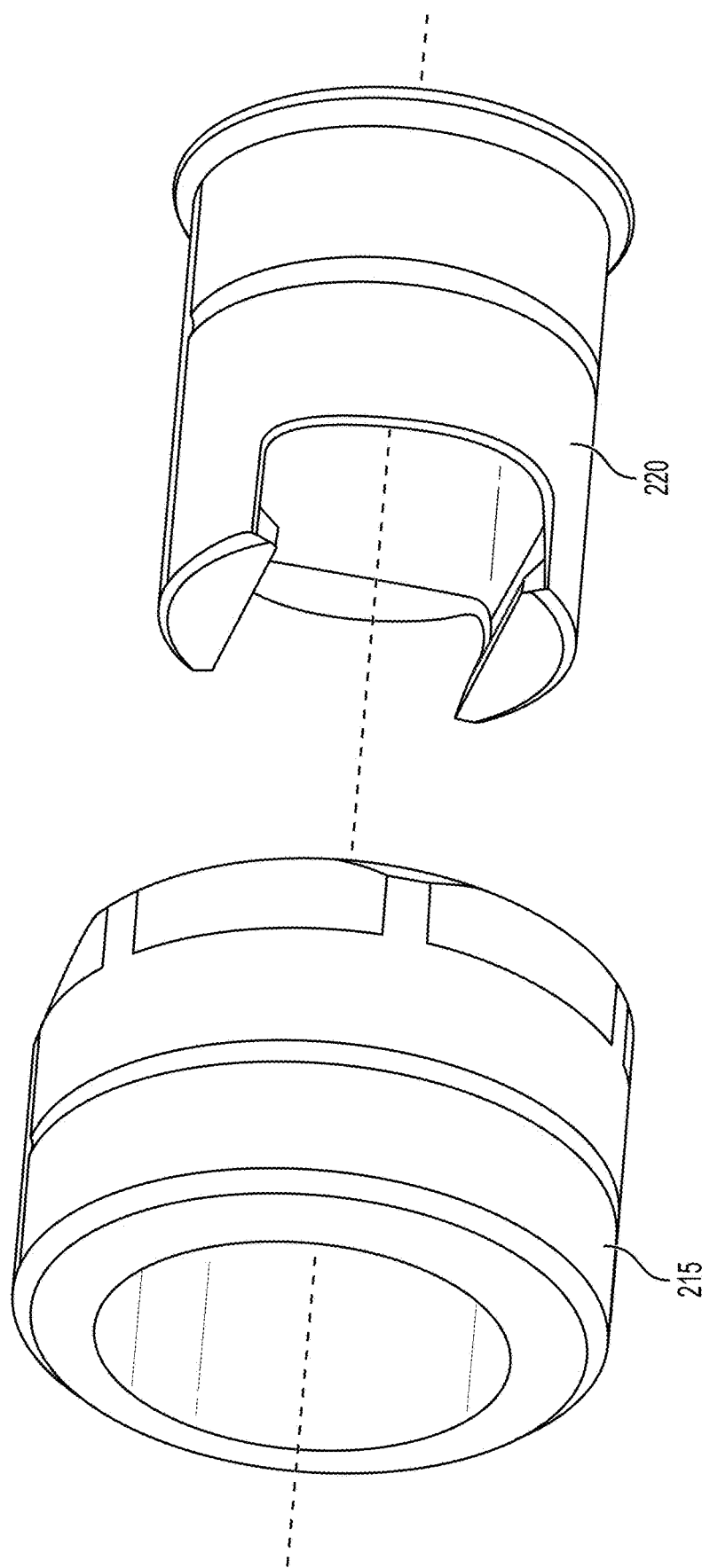
FIG. 10 is another schematic perspective exploded view of the inner bushing and outer bushing of the shear pin latch receptacle assembly of FIG. 7.

FIG. 10 is another schematic perspective exploded view of the inner bushing and outer bushing of the shear pin latch receptacle assembly of FIG. 7. FIG. 10 is included to provide clarity as to the structure of outer bushing 215 and inner bushing 220.

Figure 11:
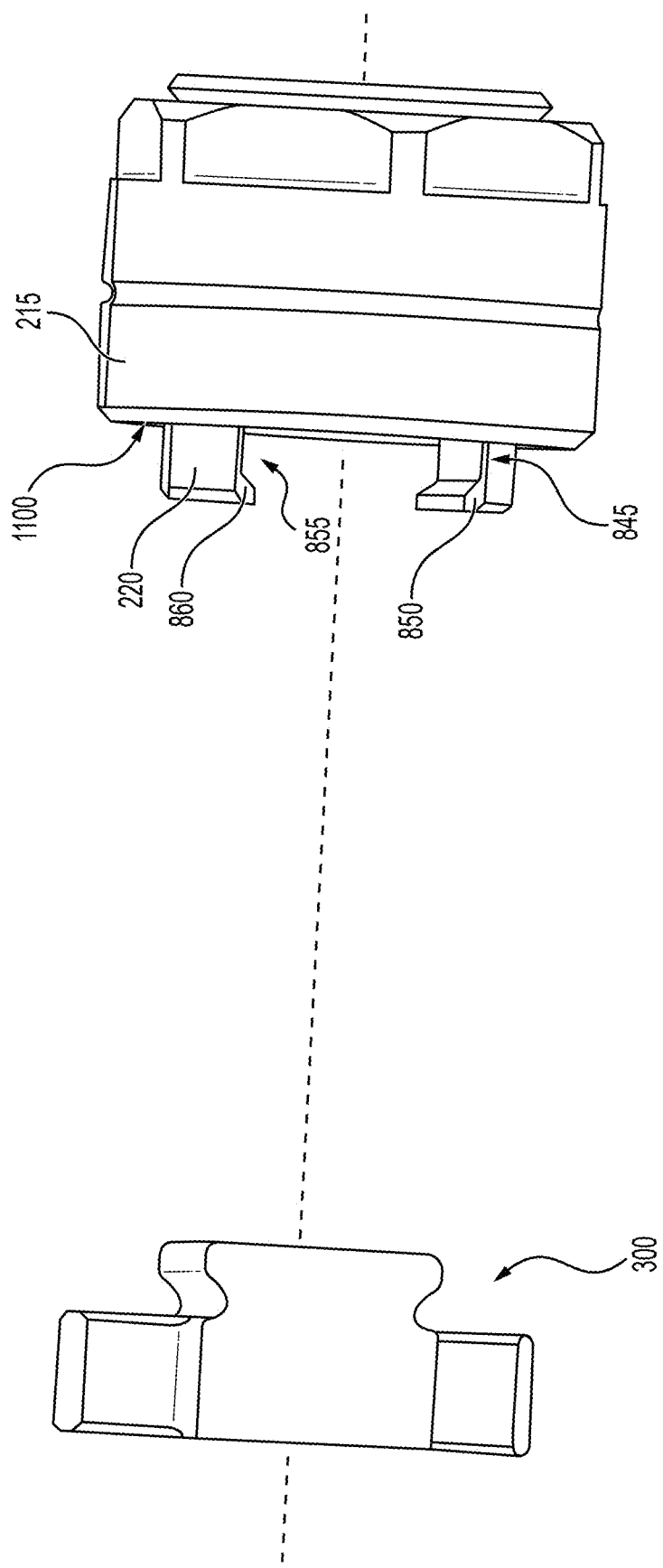
FIG. 11 is a schematic side view of the subassembly of FIG. 8 with the inner bushing inserted into the outer bushing, reflecting an initial assembly step.

FIG. 11 is a schematic side view of the subassembly of FIG. 8 with the inner bushing inserted into the outer bushing, reflecting an initial assembly step. As shown in FIG. 11, when inner bushing 220 is inserted fully into outer bushing 215, third lip 850, fourth lip 860, fifth recess 845, and sixth recess 855 are exposed beyond the rear edge 1100 of outer bushing 215.

FIG. 12 is a schematic perspective view of the subassembly in an assembled condition. As shown in FIG. 12, the next step is to insert stabilizer member 300 into engagement with inner bushing 220. Because of the dovetail type interconnection, this is accomplished by translating stabilizer member 300 in from the side, as indicated by an arrow 330 in FIG. 3.

FIG. 13 is another schematic perspective view of the subassembly in an assembled condition. FIG. 13 shows subassembly 1200 from the reverse angle as compared to FIG. 12.

Figure 14:
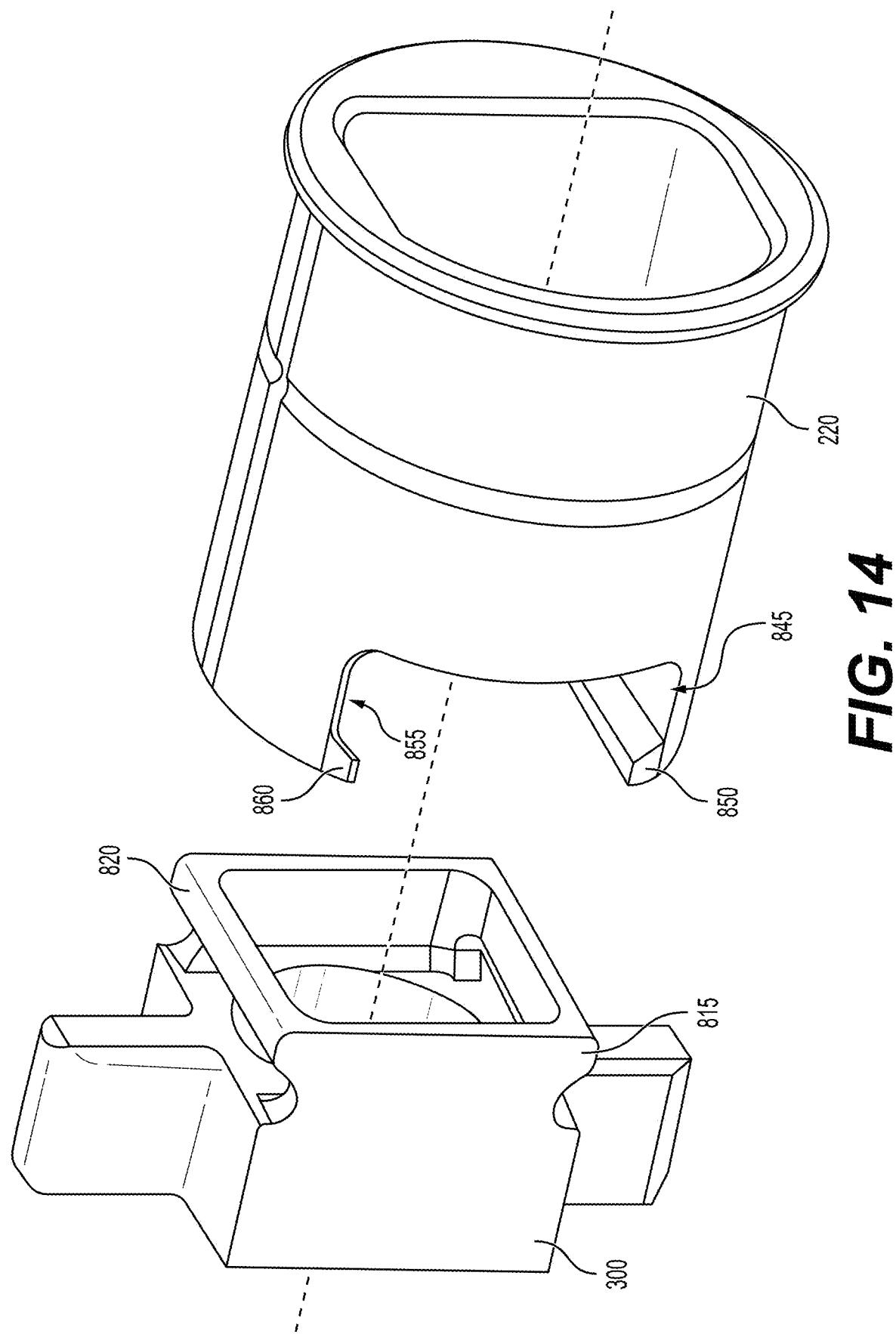
FIG. 14 is a schematic perspective exploded view of an inner bushing and stabilizer member of the subassembly shown in FIG. 7.
Figure 15:
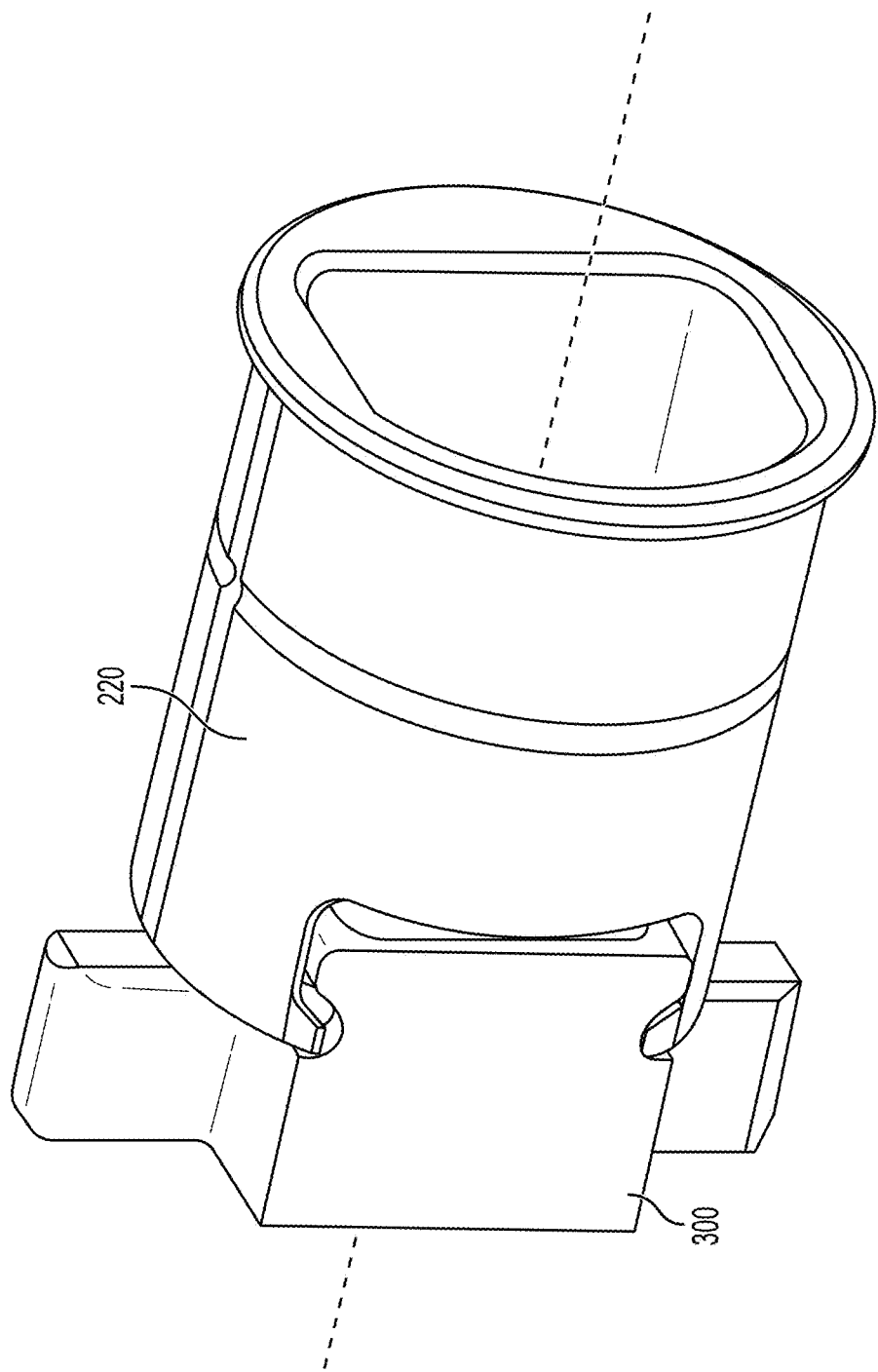
FIG. 15 is a schematic perspective assembled view of the inner bushing and stabilizer member.

FIGS. 14-16 are included in order to provide additional clarity as to how stabilizer member 300 engages with inner bushing 220. FIG. 14 is a schematic perspective exploded view of inner bushing 220 and stabilizer member 300 of subassembly 1200 shown in FIG. 7. FIG. 15 is a schematic perspective assembled view of inner bushing 200 and stabilizer member 300. FIG. 16 is a schematic side view of inner bushing 220 and stabilizer member 300 in an assembled condition. In the view shown in FIG. 16, outer bushing 215 is omitted for clarity. When the subassembly is actually assembled, inner bushing 220 is inserted into outer bushing 215 first, and then stabilizer member 300 is engaged with inner bushing 220.

Figure 17:
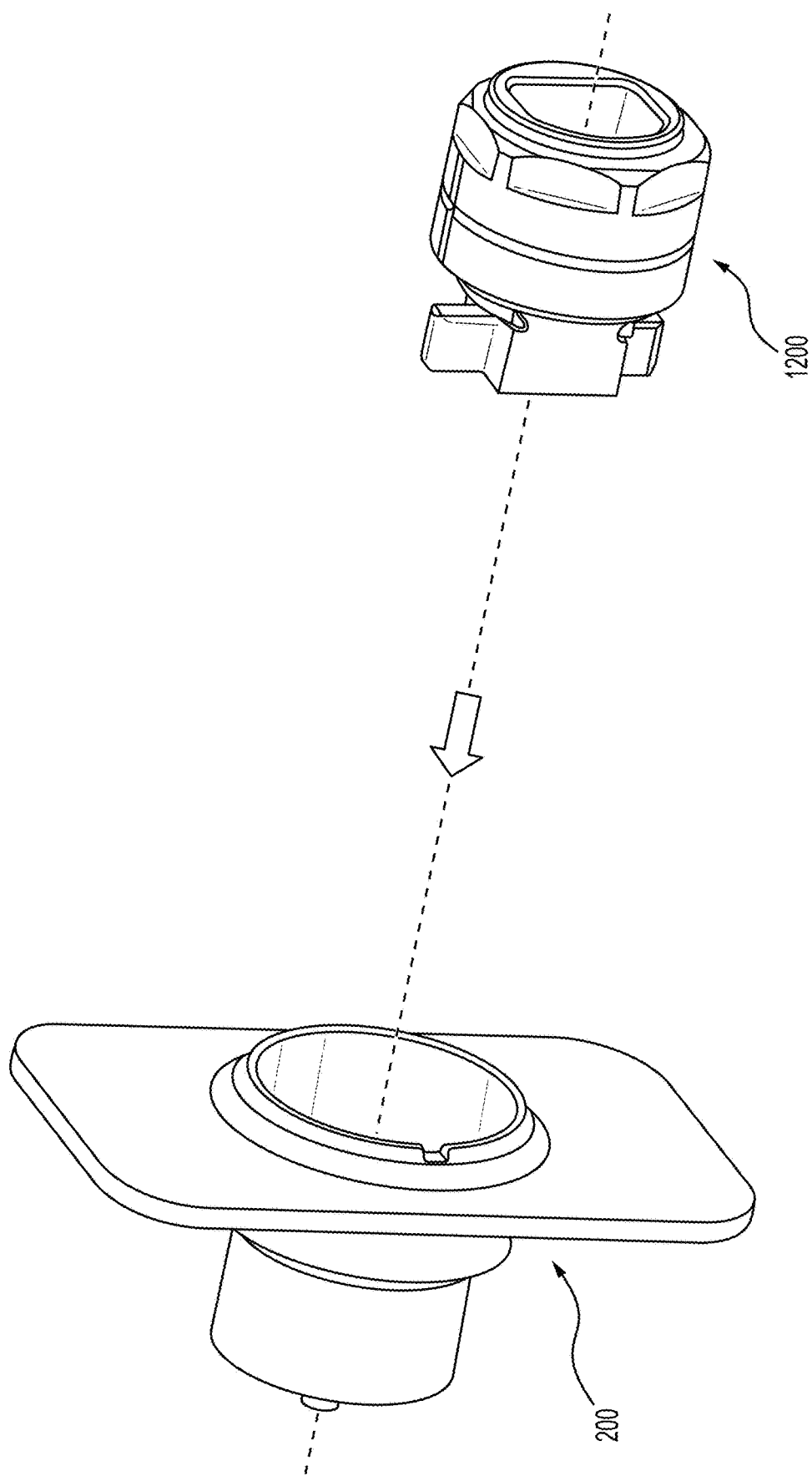
FIG. 17 is a schematic perspective view the subassembly of FIG. 7 ready for insertion into a housing of the receptacle assembly.

FIG. 17 is a schematic perspective view the subassembly of FIG. 7 ready for insertion into a housing of the receptacle assembly. Once subassembly 1200 is assembled, the subassembly can be inserted into housing 200.

The stabilizer member interlocks with the housing such that the stabilizer member does not rotate with respect to the housing. In particular, the stabilizer member includes one or more flanges extending from the body of the stabilizer member, wherein the one or more flanges are received by one or more slots in the barrel of the housing to prevent rotation of the stabilizer member with respect to the housing. In some embodiments, the stabilizer includes two opposing flanges that are received by two opposing slots in the barrel of the housing.

Figure 18:
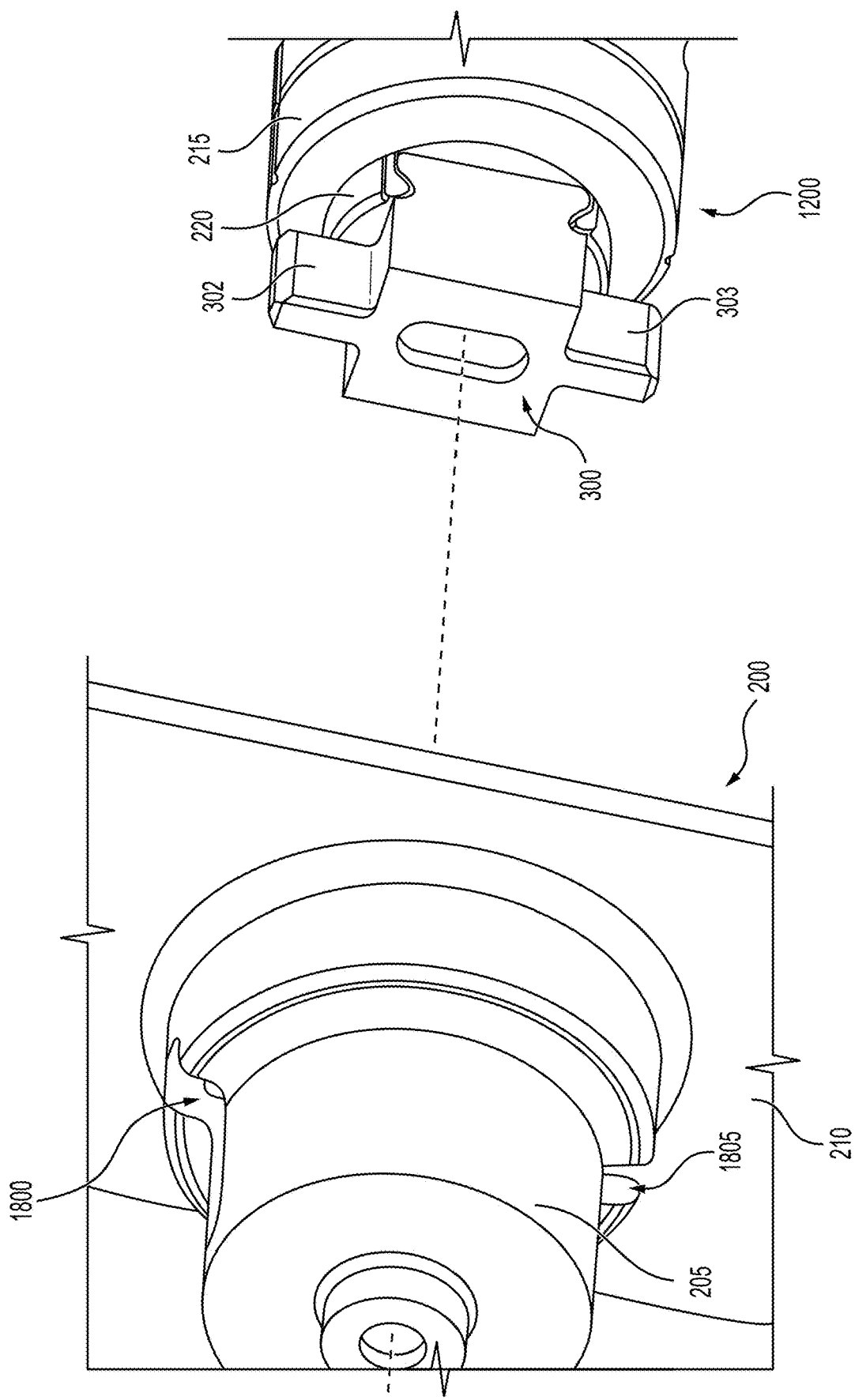
FIG. 18 is another schematic perspective view the subassembly of FIG. 7 ready for insertion into a housing of the receptacle assembly.

FIG. 18 is another schematic perspective view the subassembly of FIG. 7 ready for insertion into a housing of the receptacle assembly. As shown in FIG. 18, barrel 205 of housing 200 includes a first slot 1800 and a second slot 1805. First slot 1800 is configured to receive first flange 302 of stabilizer member 300. Second slot 1805 is configured to receive second flange 303 of stabilizer member 300. With the flanges secured within the slots, stabilizer member 300 is prevented from rotation. Also, because stabilizer member 300 is engaged with inner bushing 220, inner bushing 220 is also prevented from rotating. However, outer bushing 215 is free to be rotated in order to adjust the receptacle assembly.

Figure 19:
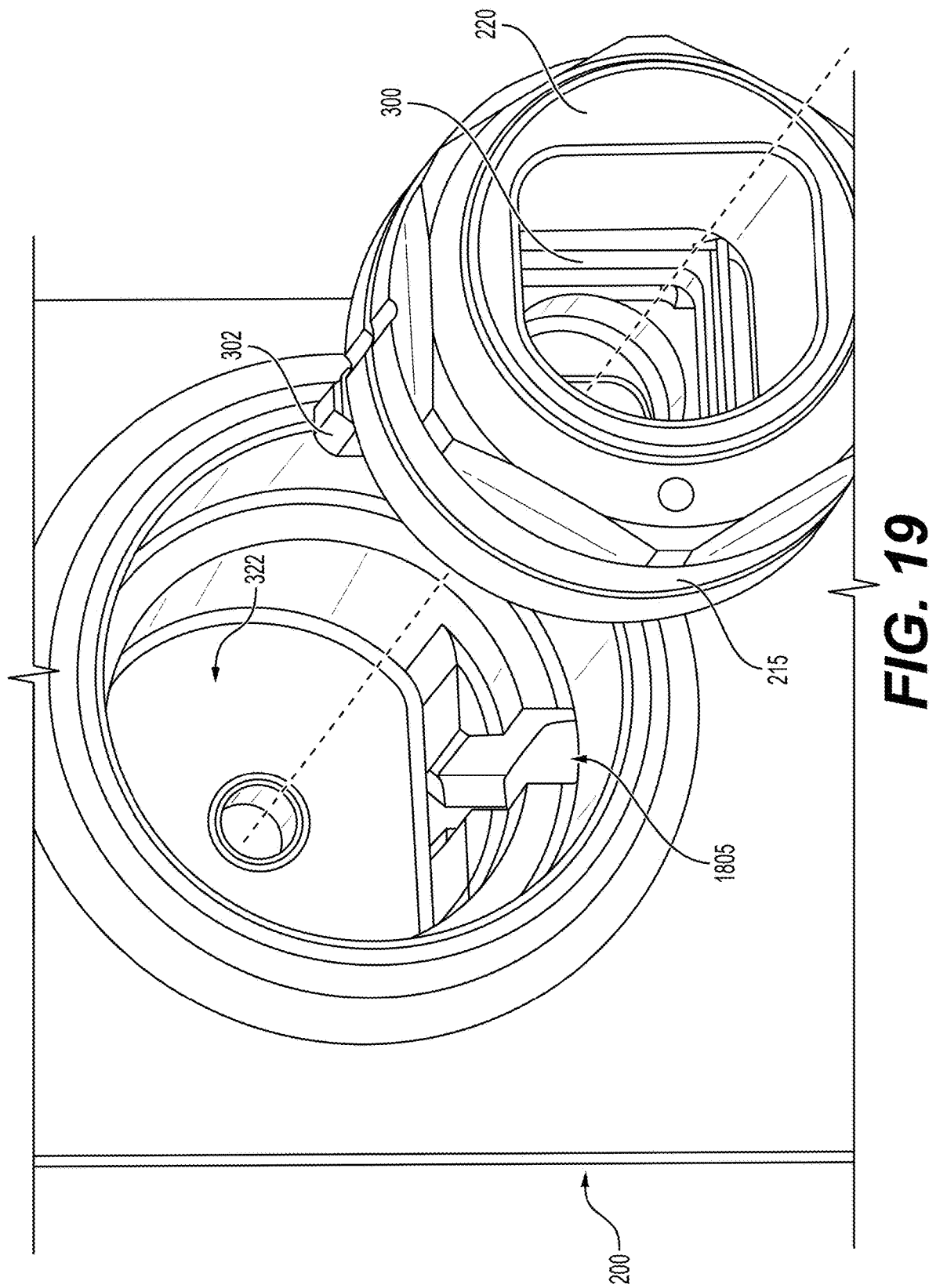
FIG. 19 is another schematic perspective view the subassembly of FIG. 7 ready for insertion into a housing of the receptacle assembly.

FIG. 19 is another schematic perspective view the subassembly of FIG. 7 ready for insertion into a housing of the receptacle assembly. FIG. 19 is included to provide a view of bore 322 and the location of the slots, with second slot 1805 shown in this view.

As discussed above, when assembled, outer bushing 215 may be rotated with respect to inner bushing 220 in order to adjust the receptacle assembly.

Figure 21:
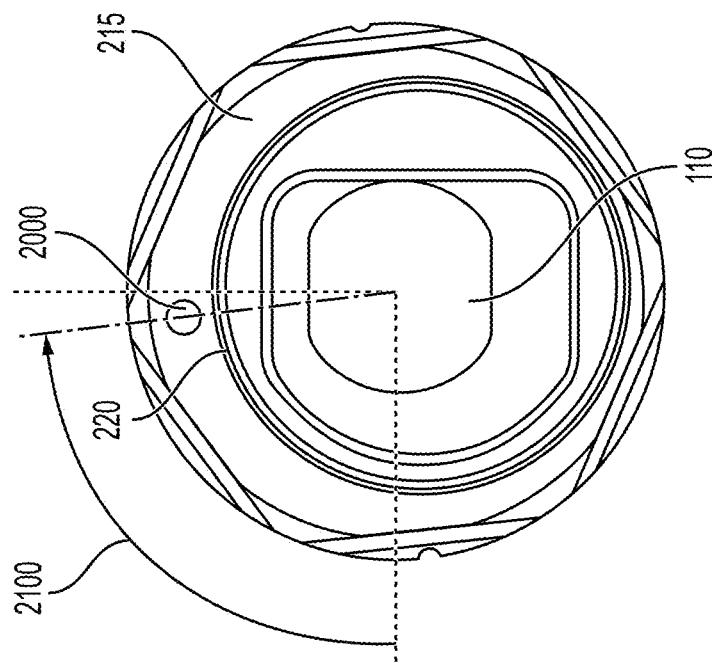
FIG. 21 is another schematic axial view of the subassembly of FIG. 7 with a shear pin inserted and with the outer bushing rotated nearly 90 degrees clockwise for adjustment of the assembly.
Figure 20:
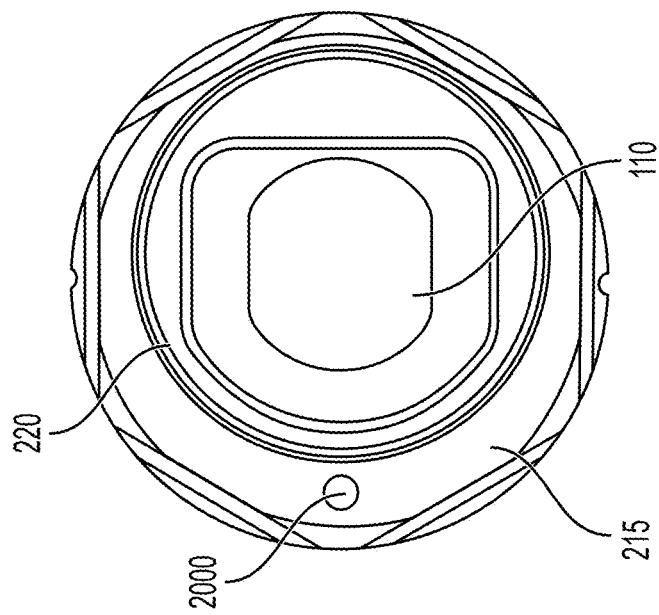
FIG. 20 is a schematic axial view of the subassembly of FIG. 7 with a shear pin inserted.

FIG. 20 is a schematic axial view of the subassembly of FIG. 7 with a shear pin 110 inserted. The location of a dimple 2000 at 9 o'clock on outer bushing 215 indicates the neutral or nominal position of the assembly. FIG. 21 is another schematic axial view of the subassembly of FIG. 7 with shear pin 110 inserted and with outer bushing 215 rotated nearly 90 degrees clockwise for adjustment of the assembly, as indicated by an arrow 2100. It will be understood that outer bushing 215 may be rotated as much as 180 degrees in order to adjust the receptacle assembly. That is, it may be rotated 90 degrees from neutral in either direction. In FIG. 21, the flat vertical face of inner bushing 220 now contacts shear pin 110. This adjustment is part of the rigging process for the door.

It will also be understood that fastener 305 is loosened prior to rotating outer bushing 215 in order to facilitate the rotation/adjustment. Once the adjustment is made, fastener 305 is retightened to the appropriate torque spec.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A shear pin latch receptacle assembly, comprising:
    an inner bushing;
    an outer eccentric bushing including a first inner bore configured to receive the inner bushing;

a stabilizer member configured to be assembled with the inner bushing and the outer eccentric bushing to form a subassembly; and a housing including a mounting plate and a barrel, the barrel defining a second inner bore configured to receive the subassembly;

wherein the outer eccentric bushing is rotatable relative to the housing in order to adjust the receptacle assembly; and wherein, when the receptacle assembly is assembled, the stabilizer member prevents rotation of the inner bushing with respect to the housing.

2. The assembly of claim 1, wherein the inner bushing interlocks with the stabilizer member such that the inner bushing does not rotate with respect to the stabilizer member.

3. The assembly of claim 2, wherein the inner bushing and the stabilizer member interlock with one another with a dovetail type interconnection.

4. The assembly of claim 2, wherein the stabilizer member interlocks with the housing such that the stabilizer member does not rotate with respect to the housing.

5. The assembly of claim 4, wherein the stabilizer member includes one or more flanges extending from a body of the stabilizer member, wherein the one or more flanges are received by one or more slots in the barrel of the housing to prevent rotation of the stabilizer member with respect to the housing.

6. The assembly of claim 5, wherein the stabilizer includes two opposing flanges that are received by two opposing slots in the barrel of the housing.

7. The assembly of claim 1, wherein the outer bushing includes a plurality of flats configured to interface with a wrench for adjustment of the receptacle assembly.

8. An aircraft, comprising:
a cabin door;
a cabin door frame; and
a shear pin latch receptacle assembly, comprising:
an inner bushing;
an outer eccentric bushing including a first inner bore configured to receive the inner bushing;
a stabilizer member configured to be assembled with the inner bushing and the outer eccentric bushing to form a subassembly; and
a housing including a mounting plate and a barrel, the barrel defining a second inner bore configured to receive the subassembly;
wherein the outer eccentric bushing is rotatable relative to the housing in order to adjust the receptacle assembly; and
wherein, when the receptacle assembly is assembled, the stabilizer member prevents rotation of the inner bushing with respect to the housing.

9. The aircraft of claim 8, wherein the inner bushing interlocks with the stabilizer member such that the inner bushing does not rotate with respect to the stabilizer member.

10. The aircraft of claim 9, wherein the inner bushing and the stabilizer member interlock with one another with a dovetail type interconnection.

11. The aircraft of claim 9, wherein the stabilizer member interlocks with the housing such that the stabilizer member does not rotate with respect to the housing.

12. The aircraft of claim 11, wherein the stabilizer member includes one or more flanges extending from a body of the stabilizer member, wherein the one or more flanges are received by one or more slots in the barrel of the housing to prevent rotation of the stabilizer member with respect to the housing.

13. The aircraft of claim 12, wherein the stabilizer includes two opposing flanges that are received by two opposing slots in the barrel of the housing.

14. The aircraft of claim 8, wherein the outer bushing includes a plurality of flats configured to interface with a wrench for adjustment of the receptacle assembly.

15. A method of assembling a shear pin latch receptacle assembly, comprising:
inserting an inner bushing into a first inner bore of an outer eccentric bushing;
engaging a stabilizer member with the inner bushing to form a subassembly including the inner bushing, the outer eccentric bushing, and the stabilizer member; and
inserting the subassembly into a second bore of a barrel of a housing,
wherein the outer eccentric bushing is rotatable relative to the housing in order to adjust the receptacle assembly; and
wherein, when the receptacle assembly is assembled, the stabilizer member prevents rotation of the inner bushing with respect to the housing.

16. The method of claim 15, wherein engaging the inner bushing with the stabilizer member includes interlocking the inner bushing with the stabilizer member.

17. The method of claim 16, wherein interlocking the inner bushing with the stabilizer member involves engagement of a dovetail type interconnection.

18. The method of claim 15, wherein the stabilizer member interlocks with the housing such that the stabilizer member does not rotate with respect to the housing.

19. The method of claim 18, wherein interlocking the stabilizer member with the housing includes engagement of one or more flanges extending from a body of the stabilizer member with one or more slots in a barrel of the housing to prevent rotation of the stabilizer member with respect to the housing.

20. The method of claim 19, wherein interlocking the stabilizer member with the housing includes engagement of two opposing flanges with two opposing slots in the barrel of the housing.

* * * * *